3,290,386
PROCESS FOR THE MANUFACTURE OF
4,4' DIHYDROXYPHENYL ETHER
Gelu Stoeff Stamatoff, Newark, Del., assignor to E. I. du
Pont de Nemours and Company, Wilmington, Del., a
corporation of Delaware
No Drawing. Filed Sept. 27, 1963, Ser. No. 312,006
2 Claims. (Cl. 260—613)

This invention relates to an improved method for the manufacture of 4,4' dihydroxyphenyl ether.

4,4' dihydroxyphenyl ether, which has the chemical formula,

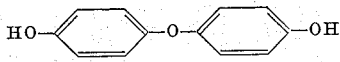

has been employed heretofore in the production of attractive polycarbonate thermoplastic resins. Methods for the production of this useful material have, however, been somewhat tedious, uncertain in their result, and of low yield. The cost of the chemical is therefore prohibitive for the manufacture of commercial plastics.

Haeussermann and Bauer, Berichte de Deutsche Chemischen Gesellschaft, volume 30, page 738 (1937), have reported that 4,4' diaminophenyl ether can be diazotized and the diazonium salt decomposed to give the desired dihydroxy compound (M.P. 160–161° C.) in very small yields.

More recently Germany Patent 609,080, issued Febuary 8, 1955, to Karl Willy Ritter, has described a process for the manufacture of 4,4' dihydroxphenyl ether by the hydroxylsis of 4,4' dibromophenyl ether with methanolic caustic soda in the presence of copper powder at a temperature of 200–300° C. A time of hydrolysis of six hours was required. The yield was from 50–65%, the recrystallized platelets melting at 164–165° C.

It has now been discovered that 4,4' dibromophenyl ether can be hydrolysed to give the desired 4,4' dihydroxyphenyl ether in substantially quantitative yield, under milder reaction conditions, and with a substantially shorter reaction time, by a process which comprises hydrolysing 4,4' dibromophenyl ether with an alkali metal hydroxide dissolved in the presence of water in an amount equal to from 25% to 50% by weight based on the caustic alkali, together with an alkali peroxide, metallic copper, and cuprous halide salt.

The metallic copper component of the catalyst is preferably massive copper or a copper-containing metal alloy such as cupro-nickel and may be conveniently provided by constructing the hydrolysis vessel of copper, or with a copper sheath or plating on the interior of a vessel constructed of another structural metal such as steel. The actual catalytic agent appears to form on the surface of the copper with some difficulty, so that, initially, starting the reaction may present difficulty. Once the reaction has been conducted in the vessel, or in the presence of metallic copper, further reactions may be accomplished without difficulty even after conventional washing processes have been applied to the metal. Polishing the metal surfaces, however, destroys the catalytic activity and again difficulty is generally experienced in starting the reaction.

The quantity of cuprous halide should generally be from about 1% to about 25% by weight of the 4,4' dibromophenyl ether employed but this is not highly critical.

The alkali metal peroxide, preferably sodium peroxide, employed should in general be from about 1 to 50% by weight of the 4,4' dibromophenyl ether. Again the concentration does not appear to be highly critical. It will be realized that peroxides of the other alkali metals are equivalent to sodium peroxide in this process, but are not preferred for economic reasons.

The caustic soda solution should be employed in substantial excess of the stoichiometric quantity needed to effect the hydrolysis, i.e., up to twenty times the stoichiometric quantity of sodium hydroxide dissolved in from about 25% to 50% by weight of water, based on the sodium hydroxide; again it will be realized that the effective hydrolytic agent is the hydroxide ion and accordingly other strong base alkali metal or quaternary ammonium hydroxides may be employed in place of the sodium hydroxide, which is preferred for economic reasons.

The reaction is suitably conducted by refluxing the ingredients under atmospheric pressure. When concentrations are employed as prescribed herein, the reflux temperature is of the order of 160° C. to about 200° C. at the onset of the reaction, and falls as the caustic alkali is consumed. The decrease in temperature may be usefully employed to follow the course of the reaction, which is generally substantially complete in about 2 hours.

The aforesaid conditions of temperature and pressure are readily attained with conventional equipment in the laboratory or on a semiworks or plant scale, however, it will be realized that higher pressures may be employed. However, above about 200° C. the reaction may "run away" and substantially all of the product lost by decomposition polymerization and the like.

After the reaction has been completed, the product, 4,4' dihydroxyphenyl ether, substantially remains in solution as the alkali metal salt, and may be recovered therefrom by neutralization of the solution with any acid, such as hydrochloric or sulfuric acids. If desired, the product may be purified by recrystallization from water.

This invention has been described with particular reference to 4,4' dihydroxphenyl ether. It will be realized, however, that the hydrolytic process of this invention may be employed for the hydrolysis of other aromatic halogen compounds.

The invention is further illustrated by the following example which should not, however, be construed as fully delineating the scope of this discovery.

*Example*

In a 1000 cc. copper flask which had been flushed with nitrogen was added 5 grams of cuprous chloride, 10 grams of sodium peroxide, 280 grams of caustic soda, 100 cc. of water and 200 grams of 4,4' dibromophenyl ether. The mixture was stirred at high speed under nitrogen and heated to the reflux temperature of 185–190° C. The heating was continued until the temperature had decreased to 155–160° C. The mixture was then cooled and diluted with water. Ice was added and the whole neutralized with hydrochloric acid, about 450 cc. of acid being required. The product was filtered, washed with water and crystallized twice from water M.P. 165–167° C. The yield was practically quantitative. Similar results were obtained with cuprous bromide.

I claim:
1. A process for the manufacture of 4,4' dihydroxyphenyl ether which comprises heating a mixture of 4,4' dibromophenyl ether with a stoichiometric excess of a caustic alkali dissolved in water in an amount of from about 25% to about 50% by weight of said alkali, and with from about 1% to about 50% by weight of an alkali metal peroxide based on the 4,4' dibromophenyl ether about 1% to 25% by weight of a cuprous halide based on 4,4' dibromophenyl ether, and metallic copper, and thereafter recovering 4,4' dihydroxyphenyl ether from the reaction product.

2. Process of claim 1 in which the said mixture is heated to reflux temperature under atmospheric pressure.

No references cited.

LEON ZITVER, *Primary Examiner.*
B. HELFIN, *Assistant Examiner.*